United States Patent
Igwe

[15] 3,688,456
[45] Sept. 5, 1972

[54] FISHING APPARATUS
[72] Inventor: Godwill M. Igwe, 180 Queen Mary Road, Apartment 708, Kingston, Ontairo, Canada
[22] Filed: July 10, 1970
[21] Appl. No.: 53,874

[52] U.S. Cl. .................................. 52/121, 43/21
[51] Int. Cl. .............................. E04h 12/34
[58] Field of Search ...... 52/111, 118, 121; 43/16, 21; 212/55

[56] References Cited

UNITED STATES PATENTS

| 3,047,107 | 7/1962 | Paramenter et al. | 52/121 |
| 2,632,530 | 3/1953 | Wagner | 52/118 |
| 2,928,493 | 3/1960 | Clements | 212/55 |
| 3,044,312 | 7/1962 | Hall et al. | 212/55 |

FOREIGN PATENTS OR APPLICATIONS

| 1,492,931 | 7/1967 | France | 212/55 |

*Primary Examiner*—Henry C. Sutherland
*Attorney*—Sim and McBurney

[57] ABSTRACT

A fishing device includes a telescoping rod, line spool, rod actuator and fishing line spool actuator. The device is energized electrically and is capable of a plurality of simultaneous or sequential operations.

2 Claims, 12 Drawing Figures

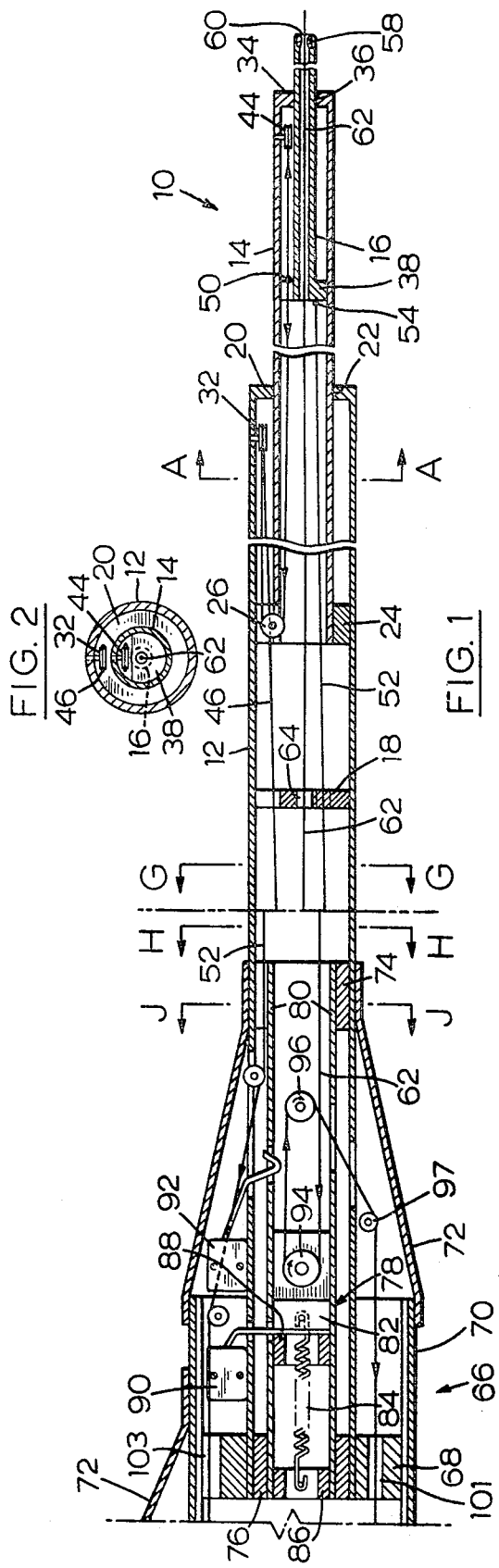
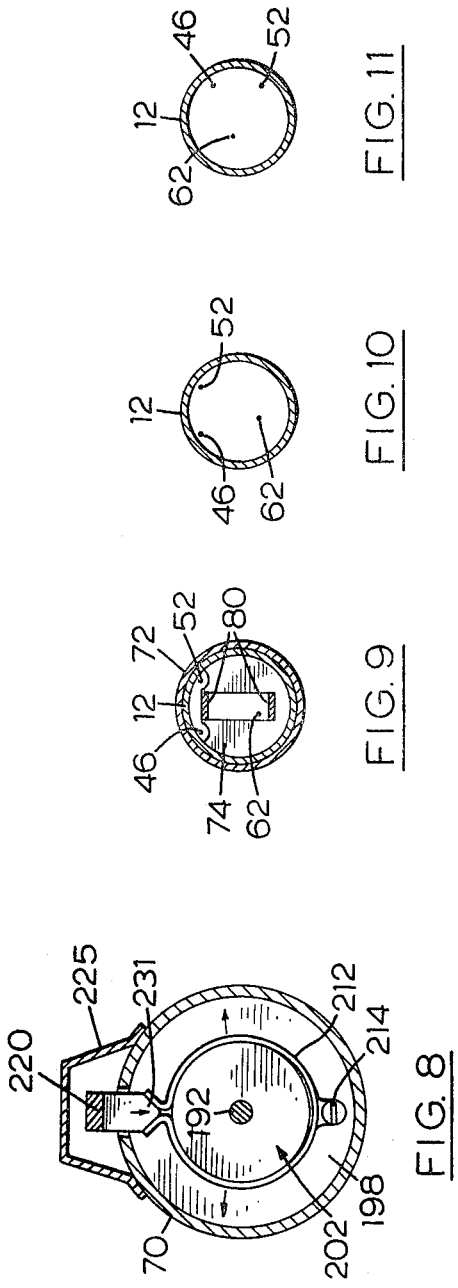
INVENTOR.
GODWILL M. IGWE
BY
*Sim M<sup>c</sup>Kinney*

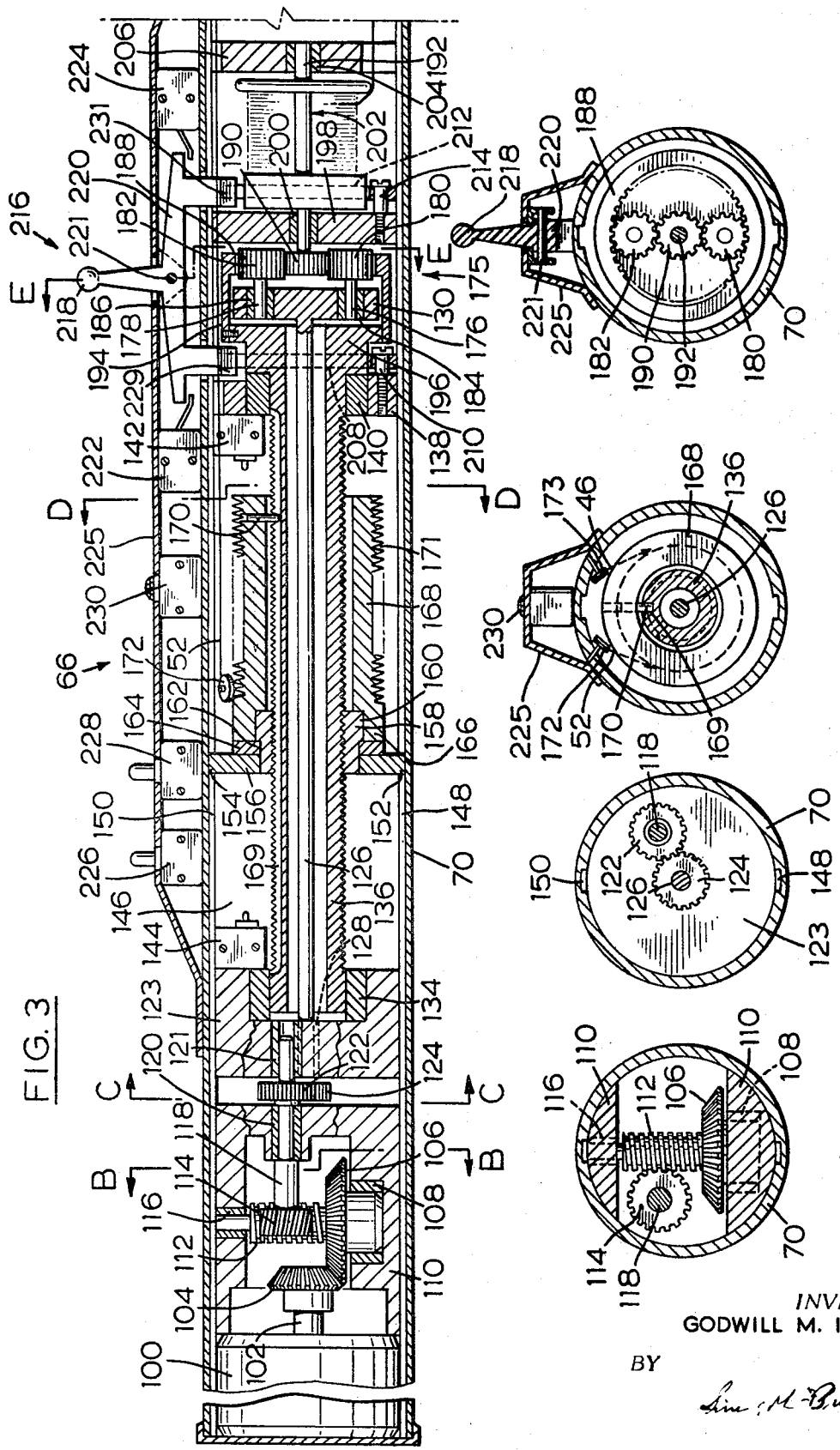

FISHING APPARATUS

This invention relates to a fishing apparatus, more particularly to a fishing apparatus having multiple electrically controlled operations.

The present invention is illustrated in the accompanying drawings, in which:

FIG. 1 is a sectional view of telescopable rod parts of the apparatus and part of the operating mechanism;

FIG. 2 is a cross-sectional view taken along line A—A of FIG. 1;

FIG. 3 is a sectional view of the remaining part of the operating mechanism of the apparatus;

FIGS. 4 to 11 are cross-sectional views taken along lines B—B, C—C, D—D, E—E, F—F, G—G, H—H and J—J respectively of FIG. 3.

Figure 12:
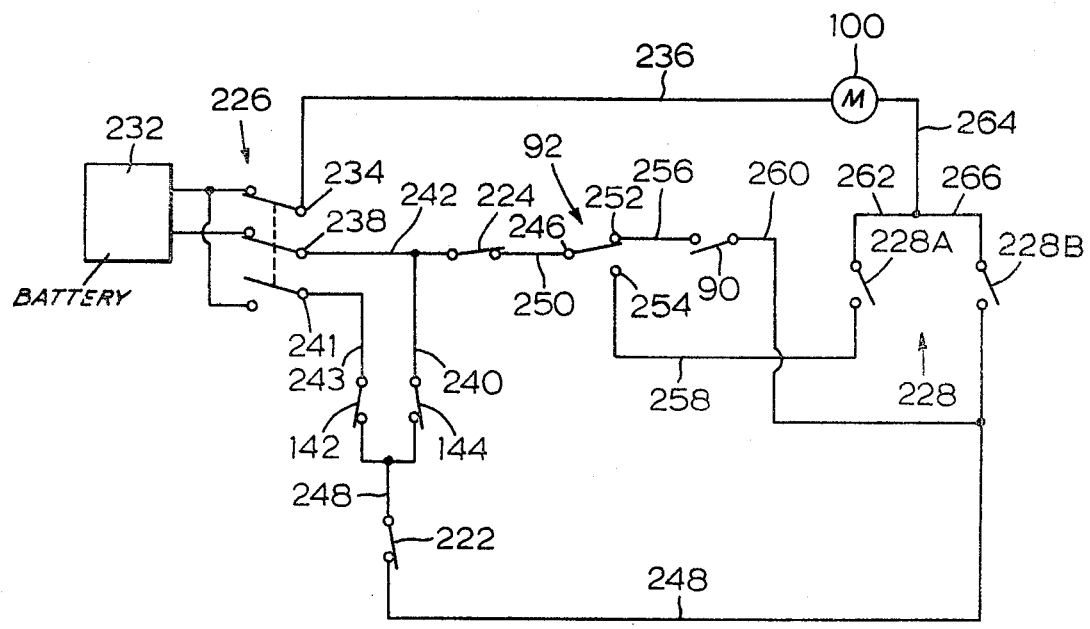
FIG. 12 is a diagram of the electrical circuit.

Referring to FIGS. 1, 2, 9, 10 and 11, a rod portion 10, constituting one embodiment of the invention, includes three axially aligned telescoping tubular members 12, 14 and 16. An end closure 18 is provided at one end of the outer tubular member 12. At the other end of the outer tubular member 12 is provided a further end closure 20 affixed to the tubular member 12 and provided with an opening 22 therein through which passes tubular member 14. A ring member 24 is provided affixed to the outer surface of the tubular member 14 and slidable on the internal surface of the tubular member 12. A pulley 26 is rotatably mounted in the ring member 24.

A pulley 32 is mounted in the internal surface of the tubular member 12 adjacent the end closure 20.

The tubular member 14 is provided with an end closure 34 having an opening 36 therein through which tubular member 16 passes. A ring member 38 is affixed to the outer surface of tubular member 16 and slidably engages the internal surface of tubular member 14. A pulley 44 is affixed to the internal surface of tubular member 14 adjacent the end closure 36.

A first operating line 46 passes through an opening in end closure 18, passes along the gap between the tubular members 12 and 14, passes around pulley 32, passes back along the gap between the tubular members 12 and 14, passes around pulley 26, passes along the gap between the tubular members 14 and 16, passes around pulley 44, passes back along the gap between tubular members 14 and 16 and is affixed to tubular member 16 at a point 50 adjacent ring member 38. A second operating line 52 is affixed to tubular member 16 at a point 54 adjacent ring member 38 and passes through an opening in the end closure 18.

In operation, pulling operating line 46 towards the left as viewed in FIG. 1, telescopes outwardly the tubular members. The extent of the telescoping is dependent on the length of line 46 pulled. To telescope the tubular members inwardly, the operating line 52 is pulled towards the left as viewed in FIG. 1.

It will be seen that the telescoping arrangement illustrated in FIG. 1 is simple to construct and may be used in many applications other than in the fishing apparatus described herein.

In addition, the telescoping arrangement has been illustrated with reference to three telescoping tubular members. The arrangement may be adapted to employ any desired number of telescoping members in excess of the three illustrated by appropriate use of pulleys and guides.

The embodiment shown in FIG. 1 utilizes tubular members of circular cross-section. Tubular members of any convenient and desired cross-section may be employed.

The rotatable pulleys 26, 32 and 44 may be replaced by any convenient means whereby the operating line 46 may pass along the tubular members. The affixing point 50 constituting the fixed end of the operating line 46, may be at any convenient position on the inner most tubular member, but it is preferred that it be located close to the inboard end of the innermost tubular member. The operating lines 46 and 52 may be constructed of any desired material.

The tubular member 16 is provided at its outboard end with a closure 58 having an opening therein through which fishing line 62 may pass. Fishing line 62 passes through the rod portion 10 and out through opening 64 in the end closure 18.

The outer tubular member 12 extends axially into the handle portion generally indicated at 66 terminating in a collar 68 located internally of a tube 70. The tube 70 is provided with a tapered portion 72 terminating at the outer surface of the tubular member 12. Mounted internally of the tubular member 12 in that portion within the tube 70 and tapered portion 72 by means of collars 74 and 76 is a limit mechanism generally indicated at 78.

The limit mechanism includes a track 80 and a flat movable member 82 slidable along the track. The flat member has one end of an expansion spring 84 attached thereto, the other end of the spring 84 being attached to a fixed member 86 mounted on the track 80. The spring normally urges the flat member 82 against a stop 88 mounted on the track 80. A first limit microswitch 90 is mounted so that when the flat member 82 is against the stop the switch is in one of its two configurations and when the member moves along the track 80 away from the stop 88, the switch is in the other of its configurations.

If desired, the switch 90 may constitute the stop 88. A second limit micro-switch 92 is located at a point along the track 80 remote from the first switch 90. The switch 92 is arranged so that it may be actuated if engaged by the flat member 82.

The flat member 82 is provided with a pulley 94 and a further pulley 96 is located adjacent the end of the limit mechanism 78 remote from the fixed member 86.

The fishing line 62 is passed along the gap between the track 80, around the pulley 94, back along the gap between the track 80, then around pulley 96 and then about pulley 97 and out of the area of the limit mechanism 78 through an opening 101 in the collar 68.

Further openings 103 (only one of which is shown) are provided in the collar 68. The operating lines 46 and 52 pass rearwardly through the area of the limit mechanism positions and through the openings 103.

The above described limit mechanism represents only one way in which the same effect can be achieved. The essential elements are a micro-switch having and being movable between two switch positions in the embodiment illustrated the switch 90, and actuating means for the switch associated with and responsive to the fishing line.

Turning now to FIGS. 3 to 8, the handle 66 includes an electric motor 100, having an output shaft 102 to which is affixed a bevel gear 104. Motor 100 includes electrical connections ( not shown) for connection to a battery or other source of direct current. Bevel gear 104 intermeshes with a further bevel gear 106 journalled in a bearing 108 in mounting 110. Attached to the bevel gear 106 is a worm screw 112 which intermeshes with a gear 114 and is journalled at its end remote from the bevel gear 106 in a bearing 116 in the mounting 110. The gear 114 is mounted on a shaft 118 which is supported in bearing 120 mounted in a transverse portion of the mounting 110 and in bearing 121 in a transverse portion of mounting 123. A gear 122 is mounted on the shaft 118 at the end thereof remote from the gear 114. Gear 122 intermeshes with gear 124 mounted on an elongated shaft 126 passing through bearing 128. Bearing 128 is mounted in collar mounting 123.

The effect of this gearing arrangement is to provide a difference in speed of rotation between shafts 102 and 126. Shaft 126 terminates in a disc 130.

The collar 123 within the tube 70 also supports a circular bearing 134 in which is mounted a hollow rod 136. Hollow rod 136 is provided with a screw threaded exterior and shaft 126 passes interiorally of the rod. A further collar 138 is provided adjacent the end of the rod 136 remote from the collar 123 and supports a bearing 140 in which rod 136 may rotate. Microswitches 142 and 144 are located one at each end of the chamber 146 defined by the collars 123 and 138.

The internal surface of the tube 70 in the region of the chamber 146 is provided with two diametrically opposed grooves 148 and 150. Seated within the grooves 148 and 150 and slidable therein are radial projections 152 and 154 of annular ring 156. Annular ring 156 is fixedly mounted on a sleeve 158 which is internally screw-threaded so that it engages the outer screw threads of the rod 136. While two grooves 148 and 150 having associated radial projections 152 and 154 are illustrated, one of such grooves and projections may be omitted, if desired.

The sleeve 158 includes a radially projecting portion 160 which defines a channel 162 between it and the ring 156. Rotatably mounted in channel 162 is an annular ring 164 affixed to the face of ring 166 which engages the portion 160.

Ring 166 is integral with an elongated cylinder 168 extending axially of the rod 136. The surface of rod 136 is also provided with an elongated groove 169 into which projects a pin 170 affixed to the cylinder 168. The purpose of this pin will become apparent hereinafter.

The external surface of the cylinder 168 is provided with a continuous helical groove 171, the purpose of which will become apparent.

Rotation of the rod 136 imparts two motions to the cylinder 168, namely, rotational motion due to the interaction of the pin 170 in the elongated groove in the surface of the rod 136 and the cylinder, and translational motion due to the fixed orientation of sleeve 158, and the interaction of the screw threads on the rod 136 and the sleeve. This mechanism constitutes a second embodiment of the invention. While such mechanism is employed in the present invention to produce the telescoping effect of the rod described above with reference to FIG. 1, it clearly may be applied to other devices where both translational and rotational motion are required.

The provision of grooves 148 and 150 in the internal walls of the tube 70 merely represents one manner in which part of the movable member is prevented from rotational movement while the remainder rotates under the action of a screw thread. Other constructions clearly are possible.

As indicated above in connection with FIG. 1, the operating lines 46 and 52 through openings in collar 68 pass over pulleys 98. They next pass over pulleys 173 and 172 respectively. One of the lines is affixed to one end of the rotating cylinder 168 and passed about the grooves in the outer surface thereof commencing from the end to which it is attached. The other line is attached to the other end of the cylinder 168 and passed about the grooves in the outer surface of the cylinder commencing from the end to which it is attached.

Since pulleys 173 and 172 are fixed relative to the cylinder 168, rotation of the rod 136 producing both rotational and translational motion, pulls one of the operating lines in while playing the other one out or pulls the other one in and lets the first one out, depending on the direction of the rotational and translational movement of the cylinder 168. Thus, depending on the direction of such movements, the telescoping members 12, 14 and 16 ( FIG. 1) will telescope out or in.

Disc 130 integral with one end of shaft 126 constitutes part of a differential gearing mechanism 175. Gear shafts 176, 178 are affixed to gears 180 and 182 respectively. The free ends of the shafts 176 and 178 are journalled in bearings 184, 186 which are formed in the disc 130.

Gears 180 and 182 intermesh externally with a ring gear 188 and internally with a gear 190 mounted on a shaft 192. The ring gear 188 is integral with or attached to a skirt 194 integral with a radially projecting portion 196 of the shaft 136. Shaft 192 passes through a collar 198 and engages a bearing 200 mounted in the collar. The shaft 192 terminates in a line spool mechanism shown schematically at 202 journalled for rotation in bearing 204 formed in cross-member 206. The fishing line 62 after passing over pulley 99 passes over pulley 205 in cross-member 206 and is wrapped around the line spool.

A resilient clutch or brake band 208 is positioned about portion 196 normally in engagement therewith. The clutch band 208 is mounted on pin 210 fixed to collar 138. A second resilient clutch or brake band 212 is positioned about a part of the line spool mechanism 202 normally in engagement therewith. The clutch band 212 is mounted on pin 214 fixed to collar 198.

The clutch bands 208 and 212 may be affixed directly to the body 70, if desired. The resilience of the clutch bands may be inherent or induced by the use of suitable springs.

An operating mechanism 216 includes an actuating knob 218 and a rod 220 capable of pivotal movement about pin 221 between positions defined by the microswitches 222 and 224 mounted in a controls casing 225 mounted externally of tube 70.

The clutch bands are each of the type which include jaws whereby insertion of an operator in the jaw expands the band and frees the clutch. The rod 220 has mounted thereon operators 229 and 231 which serve to release clutch bands 208 and 212 respectively.

Upon rotation of the shaft 126, if clutch band 208 is engaged and clutch band 212 is released, the rotational motion in the shaft 126 is transmitted by the differential gearing 175 to the line spool mechanism 202. On the other hand, if clutch band 212 is engaged and clutch band 208 is released, then the rotational movement of the shaft 126 is transmitted by the differential gearing 175 to the shaft 136. Both clutch bands may be released, in which case both the line spool mechanism and the shaft operate.

The provision of clutch bands represents only one way of transmitting rotational motion from the output of the electric motor 100 to the translational and/or rotational mechanism, thereby actuating the telescoping mechanism, or the line spool mechanism thereby reeling in or reeling out fishing line or both. Other manners of achieving the same effect may be employed. Further, two separate motors may be employed, one to operate the rod mechanism and the other to operate the line spool mechanism.

The controls casing 225 in addition to the operating mechanism 216 and switches 222 and 224 includes further switches 226 and 228 and a warning light 230.

The electrical circuitry of FIG. 12 will now be described. Motor 100 is energized by a battery 232. The battery is connected to a cross-over switch 226 whereby the polarity of output poles may be reversed, so that the output shaft 102 of the motor 100 may be rotated in a clockwise or anti-clockwise direction depending on the position of the switch 226.

One output pole 234 is connected directly to motor 100 by line 236. Another output pole 238 is connected both to switch 224 by line 242 and to switch 222 by line 240 through limit switch 144. A further output pole 241 is connected to switch 222 by line 243 through limit switch 142. Switch 222 is closed and switch 224 opens when rod 220 is pivoted upwardly at its right end as viewed in FIG. 3 so that clutch band 208 is released and clutch band 212 is engaged. Switch 224 is closed and switch 222 opens when rod 220 is pivoted upwardly at its left end as viewed in FIG. 3 so that clutch band 212 is released and clutch band 208 is engaged.

The limit switches 142 and 144 are normally closed. When cylinder 168 engages switch 142 this switch is opened thereby breaking the circuit to the motor. When ring 156 engages switch 144 this switch is opened and the circuit is broken.

Switch 222 is connected to switch 228 by line 248. Switch 224 is connected to one input pole 246 of limit switch 92 by line 250. Switch 92 has two output poles 252 and 254. The switch is normally positioned with poles 246 and 252 connected. Upon engagement of flat member 82, the poles 246 and 254 become connected and poles 246 and 252 disconnected.

Pole 252 is connected by line 256 to switch 90. Switch 90 is normally open and closes when the flat member 82 is pulled away from stop 88 against the action of the spring 84. Switch 90 is shown as a simple two-pole switch. In practice, this switch is the type whereby upon opening of the switch the leads to the motor are shorted. The reason for this will become apparent hereinafter. For the reason of ease of illustration the switch 90 is shown as a simple switch.

Pole 254 and switch 90 are connected by lines 258 and 260 respectively to switch 228. The switch 228 is shown as consisting of two simple switches 228A and 228B. Switch 228A is connected by line 262 and line 264 to motor 100 and switch 228B is connected by line 266 and line 264 to motor 100.

Switch 228 is a three-position switch operable in the following modes: 228B closed and 228A open, 228B open and 228A closed and 228B open and 228A open.

In operation, a battery is connected to the leads from the input side of cross-over switch 226. Assume that the rod portion 10 (FIG. 1) is fully retracted, cylinder 168 engages limit switch 142, there is no tension in the line 62 so that member 82 engages stop 88, switch 228 is in the mode 228A open, 228B open and that rod 220 does not engage either of switches 222 and 224. The cross-over switch 226 is placed in its "forward" mode.

The switch 228 is moved to the mode 228B closed, 228A open and the rod 220 is moved by operation of handle 218 to close switch 222 and open switch 224. This motion simultaneously releases clutch band 208. Switch 142 is open due to engagement of the cylinder, but the motor runs because the mode of the switch 226 is as illustrated. The motor 100 turns shaft 126 by reason of its geared connection with the output shaft 102. Since the reel mechanism is held fast by clutch band 212 and rod 136 is free to rotate since clutch 208 is released, the motion in shaft 126 is imparted to the shaft 136 through the differential. Rotation of the shaft 136 causes cylinder 168 to rotate with the shaft. At the same time cylinder 168 moves along the shaft 136 by reason of the non-rotatable position of the sleeve 158.

As soon as the cylinder 168 moves away from engagement with switch 142 it closes. As the cylinder rotates and translates it draws operating line 46 onto its grooved surface and simultaneously plays out operating line 52 from its grooved surface. The pulling of the line 46 causes the rod 10 to telescope out. This action continues until ring 156 engages and thereby opens switch 144 breaking the electrical circuit and hence stopping the motor. The shaft 136 is preferably of a length such that the ring 156 engages the switch 144 when the rod portion 10 has reached its maximum or any desired telescoped extremity.

To telescope the tubular members 12, 14 and 16 back to their retracted position, the cross-over switch 226 is moved to its "backward" mode, so that since switch 142 is closed the output shaft 102 of the motor 100 and hence shaft 136 rotates in the reverse direction, causing the cylinder 136 to rotate in the reverse direction and translate from right to left as viewed in FIG. 3. As soon as the ring 156 is disengaged from switch 144, the switch 144 closes. This action causes operating line 52 to be drawn into the grooves on the surface of the cylinder 136 and operating line 46 to be played out off the grooves. The pulling action of line 52 causes the tubular members 12, 14 and 16 to telescopically retract.

Such action continues until cylinder 136 engages and thereby opens switch 142 breaking the electrical circuit and hence stopping the motor. The mechanism is preferably arranged so that the motor stops when the rod portion 10 is fully retracted.

Assuming that the rod portion 10 is fully outwardly telescoped, i.e., with ring 156 engaging switch 144 and hence with the circuit open, the switch 228 is in the "-forward" mode, i.e., 228B closed, 228A open, rod 220 is moved by handle 218 to its other extremity of pivotal movement to thereby close switch 224 and open switch 222. In this position, clutch band 212 is disengaged while clutch band 208 is engaged. During pivotal movement of the rod 220, the rod 220 passes through a position where both switches 222 and 224 are closed and both clutch bands 208 and 212 are disengaged. In this position, both the reel mechanism and the rod 136 may operate.

Upon applying a tension to fishing line 62, such as by casting, or simply the presence of a weight, the flat member 82 moves to the right along the tracks 80 away from stop 70 thereby closing switch 90 causing the motor 100 to run. The motor drives the reel mechanism 202, reeling out line. Upon release of the tension, such as the weight reaching the bottom of the body of water being fished, the spring 84 returns the flat member 82 to its original position, thereby opening switch 90 and shutting off the motor 100. In order to avoid run on of the line 62, the switch 90 is such that upon opening the switch the motor 100 is shorted out so that it stops substantially instantaneously.

It may be desired to cease reel-out of the line 62 prior to release of the tension, the switch 228 is moved to the mode 228A open, 228B open, thereby opening the circuit and shutting off the motor.

Upon shutting-off of the motor 100, either by means of the tension or by actuation of switch 228, the rod may be set to "automatic" operation by placing switch 228 in the mode 228A closed, 228A open. This action illuminates light 230 indicating this "automatic" setting. The cross-over switch 226 may be kept in the same mode or reversed. Upon a fish biting, tension again is placed in the line 62 which pulls the flat member 82 along the tracks 80 until it engages switch 92 and moves it to the position where poles 246 and 254 are joined, thereby completing the circuit and starting the motor 100. Line will reel out if switch 226 is maintained in the "forward" mode or reel in if the switch 226 is in its "backward" mode.

Alternatively, if the motor is shut off by release of tension in the line, the circuit may be left in the same mode, so that upon a fish biting tension again is applied to the line, pulling flat member 82 away from switch 90, thereby closing the circuit and actuating the motor 100, reeling out the line. The switch 226 may be reversed to its "backward" position, in which case upon a fish biting the line will reel in.

An audible warning may be associated with reel mechanism 202 to warn the angler of the bite. The angler may then by simple manipulation of the switches play out line or play it in. First of all, the switch 228 is moved when it is in its "automatic" mode to the mode 228A open, 228B closed. The switch is of course already in this mode when the circuit has been broken by release of tension in the line 62. Whether the reel mechanism 202 reels in or out depends on the mode of the switch 226.

As a modification of the above, the rod 220 may be pivoted after release of the tension in the line or after setting to the "automatic" mode and switch 226 moved to its "backward" position, so that upon a fish biting the rod telescopes in thereby pulling in the fish.

It may be desired to perform both operations successively, i.e., reel in the line 62 and then retract the rod 10 and this may be achieved by simple manipulation of rod 220. Further, where two motors are employed, or where the rod 220 is in the position with both switches 222 and 224 closed, both operations may be performed simultaneously if desired. The circuit described above represents only one way in which the desired effects may be achieved and clearly modifications are possible.

The fishing rod may be utilized for all types of fishing. The rod may be constructed of materials and be provided of suitable dimensions to suit the particular type of fishing undertaken. It will be seen that the present invention provides a fishing rod which is simple to operate and performs a variety of different functions in unique manner.

Modifications are possible within the scope of the present invention.

What I claim is:

1. An apparatus including an elongated rod having a threaded surface, first means having threads in engagement with said threaded surface, stop means preventing said first means from rotating about its axis, second elongated means in the form of a cylinder mounted on said rod for rotational movement in unison with said rod but out of threaded engagement with said surface, the outer surface of said cylinder having a continuous helical groove formed therein, said second elongated means being capable of sliding axial movement along said rod and being attached to said first means and rotatable relative thereto, first, second and third elongated telescopable cylinders, first spacing means affixed to said first cylinder adjacent the forward end thereof in sliding engagement with the outer surface of said second cylinder, second spacing means affixed to said second cylinder adjacent the rearward end thereof and in sliding engagement with the inner surface of said first cylinder, third spacing means affixed to said second cylinder adjacent the forward end thereof and in sliding engagement with the outer surface of said third cylinder, fourth spacing means affixed to said third cylinder adjacent the rearward end thereof and in sliding engagement with the inner surface of said second cylinder, first guide means located adjacent the forward end and internal of said first member, second guide means located adjacent the rearward end of said second member, third guide means located adjacent the forward end and internal of said second member, a first continuous actuating line affixed at one end to said third cylinder adjacent said fourth sapcing means, passing axially of said cylinders successively about said first, second and third guide means, and passing in engagement with a first part of said helical groove and terminating in said second elongated means, and a second actuating line affixed at one end to said third cylinder adjacent said fourth spacing means and at the other end to said second elongated means after passing in engagement with another part of said helical groove, whereby upon rotation of said rod, said second elongated means rotates about its axis, simultaneously moves axially along said rod and simultaneously either, depending on the direction of rotation of said second elongated means, draws said first operating line into said groove while letting out said second operating line from said groove or draws said second operating line into said groove while letting out said first operating line from said groove, and thereby said first, second and third cylinders telescope axially relative to each other.

2. The apparatus of claim 1 wherein said guide means are pulleys.

* * * * *